UNITED STATES PATENT OFFICE.

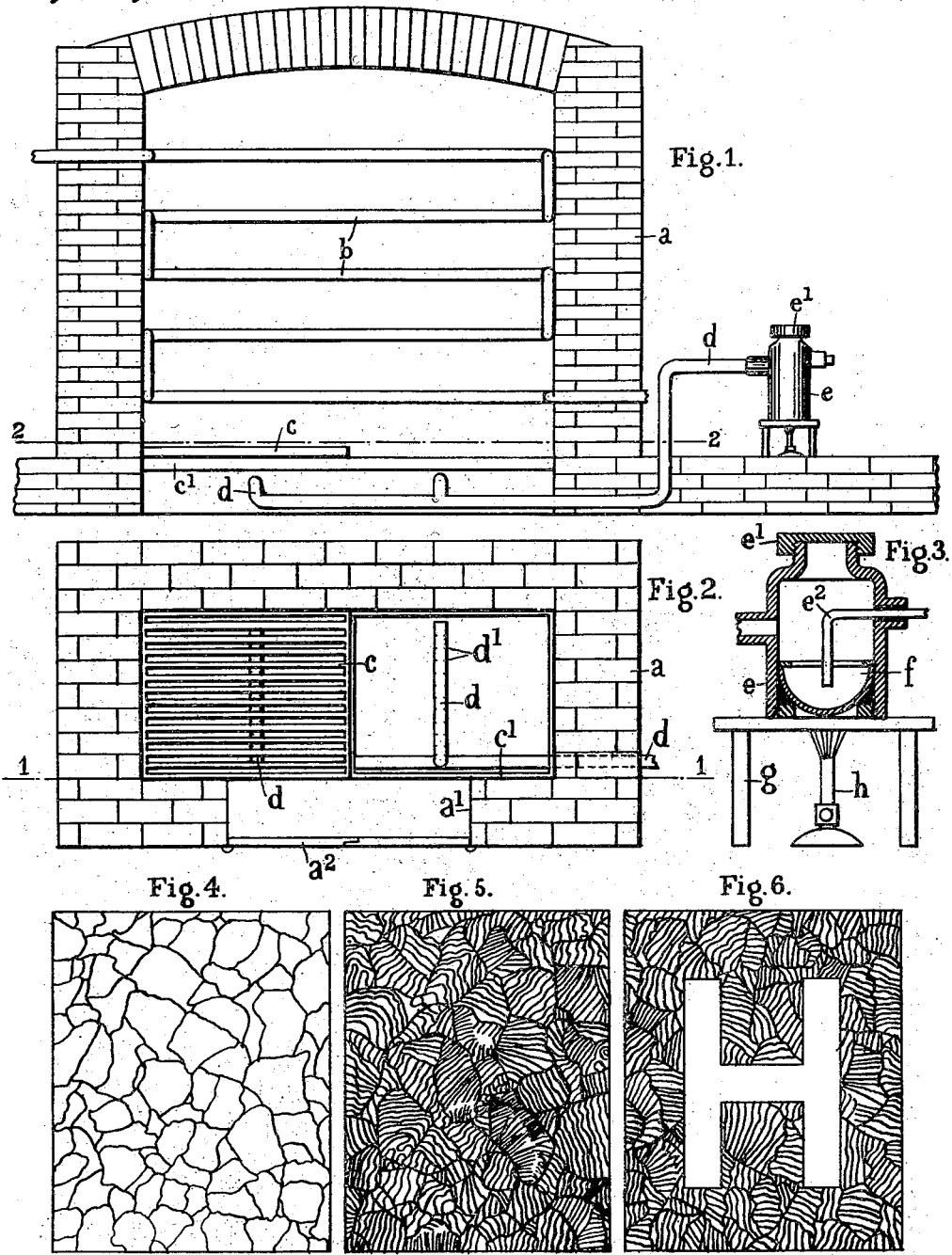

GEORGE H. HADFIELD, OF MITCHAM, AND ALFRED E. BAWTREE, OF SUTTON, ENGLAND, ASSIGNORS TO HADFIELDS (MERTON) LIMITED, OF MITCHAM, ENGLAND, A CORPORATION OF GREAT BRITAIN.

TREATMENT OF DECORATIVE SURFACES.

1,252,001.   Specification of Letters Patent.   Patented Jan. 1, 1918.

Application filed September 18, 1917.   Serial No. 191,978.

*To all whom it may concern:*

Be it known that we, GEORGE HUGH HADFIELD and ALFRED EDWIN BAWTREE, subjects of the King of Great Britain, residing respectively, at Mitcham and Sutton, both in the county of Surrey, England, have invented certain new and useful Improvements in Treatments of Decorative Surfaces, of which the following is a full, clear, and exact description.

The invention relates to a process for treating surfaces coated with fluid containing Chinese wood oil and linseed oil or either of them, or oils producing like or approximately like effects, such fluid being hereinafter referred to as varnish, by which process the crystalline structure, color and hardness of the surface can be modified.

The essence of the invention consists of treating the varnished surface with nitric acid vapor or equivalent vapors capable of producing crystalline structure, color and hardness, or any of them, at temperatures not exceeding 120 degrees centigrade, and also of adjusting the composition of the varnish to react suitably with the vapor or vapors to be employed.

The term nitric acid vapor or its equivalent may include a gas or mixture of gases, whether homogeneous or containing solid or fluid particles in suspension.

With reference to crystalline structure, it is known that some varnishes which contain Chinese wood oil, will, when stoved in an ordinary internally heated gas oven, yield a more or less crystalline surface, but the method has been of little use owing to lack of means of controlling the effect.

The following are examples of applications of the invention:

A. We have found that nitric acid vapor causes a varnish to assume a mat, crystalline, honeycomb or meshed surface, such surface being herein referred to as crystalline. The same vapor has the power of toughening the surface; also, it has the power of imparting coloration.

B. Many other reagents are capable of effecting one or more of the results obtainable with nitric acid and therefore of constituting an equivalent of nitric acid for the purposes of this invention. Whether a vapor constitutes an equivalent of nitric acid can be readily ascertained by the following test:

A piece of glass 10 inches by 6 inches is scored with a diamond with lines which divide it up into 10 equal parts each 3 inches by 2 inches, and is coated evenly with the following varnish, pine tree rosin (turpentine residue), 25 per cent., Chinese wood oil, 30 per cent., linseed oil, 20 per cent., turpentine, 25 per cent., and is then broken into its ten divisions, which are numbered respectively one to ten.

No. 1 is exposed to the vapor under examination of full strength.

No. 2, to the same vapor diluted with 100 times its volume of pure air, that is, air of the country as distinguished from that of urban or manufacturing districts.

No. 3, to the same vapor diluted with 10,000 volumes of pure air.

No. 4, to pure air alone, and

No. 5, to the unmodified atmosphere of some known form of ordinary internally heated gas oven.

The above five atmospheres are maintained at a temperature between 15 and 25 degrees centigrade, and the pieces of glass are examined periodically during a period not exceeding 48 hours. If at any time either No. 1, No. 2, or No. 3 shows:—

(*a*) Some form of crystalline structure, while both Nos. 4 and 5 remain either wet or dried glossy.

(*b*) A deeper coloration than that possessed by either No. 4 or No. 5.

(*c*) A harder surface than that exhibited by either No. 4 or No. 5,— the vapor under examination answers our test of a nitric acid equivalent.

Nos. 6 to 10 are subjected to similar tests to Nos. 1 to 5 with the sole differences that the temperature is between 105 and 115 degrees centigrade and the exposure is carried out for a maximum period of 12 hours. If either No. 6, 7, or 8 differs from Nos. 9 and 10 in either of the above particulars, (*a*), (*b*), or (*c*), the vapor under examination answers to our test of a nitric acid equivalent.

C. We may exclude any particular vapor when we wish to avoid the special effect it is capable of producing.

D. By mixing with nitric acid vapor or its equivalent, other vapor or vapors, which alone may not have any action on the varnish, the action of the nitric acid or its equivalent can be modified.

E. The same varnished surface may be exposed to more than one treatment of vapor in succession, one of which vapors must contain an equivalent of nitric acid.

F. By modifying the composition of the varnish the effect obtainable under uniform conditions of nitric acid or equivalent vapor treatment can be modified.

G. By treating the same surface locally with differently compounded varnish, local effects can be obtained. When two varnishes are made to differ by adding something to one of them, it is evident that the whole surface can be coated with the primary varnish and the additional material can be added *in situ* either before or after such general coating.

The following are specific examples of applications of our invention, but it is evident that many other applications are possible:

A1. A surface is coated with the varnish, Kongo gum, 21 per cent., Chinese wood oil, 23 per cent., linseed oil, 9 per cent., petroleum spirit, 45 per cent., and is exposed to a mixture of nitric acid vapor with 1,000 times its volume of air at a temperature of 60 degrees centigrade. In about 15 minutes the surface will assume a beautiful crystalline structure which can always be repeated by adhering to the same conditions.

A2. If the surface coated as above be exposed to nitric acid vapor diluted with 50 volumes of air at 120 degrees centigrade, it will remain glossy and in 5 minutes will have attained a beautiful lemon yellow shade hitherto only obtainable by the use of dyes.

A3. If similar surfaces be treated as described in A1 and A2 above, they will have become sufficiently dry for many purposes, whereas if treated in pure air for the same times and at the same temperatures, the films would have remained comparatively wet.

A4. If example A1 had been carried out at a temperature of 15 degrees centigrade with nitric acid vapor of the strength employed in example A2, the surface would have assumed a fine mat structure, resembling ground glass, in about 10 minutes.

B1. If sulfur dioxid vapor replace the nitric acid vapor in example A2, the film will assume a beautiful orange gold shade of quite a distinctly different color to that obtained in A2.

C1. If it is wished to dry a coating of varnish as used in the above examples, practically colorless, prolonged baking in pure air at 120 degrees centigrade will be required. In a manufacturing district the air will contain nitric acid and sulfur dioxid, which, as shown in the above examples will cause coloration. In such a district therefore, the air may be passed through a solution of caustic soda before admitting it to the oven.

D1. If one per cent. of sulfur dioxid be added to the vapor in example A1, the size of the crystalline structure will be modified.

D2. If ten per cent. of steam or of carbon dioxid be substituted for the sulfur dioxid in example D1, the crystalline effect will also be modified.

E1. If the coating of varnish in example A1 be partially dried in pure air for 20 minutes at 50 degrees centigrade before exposure to the nitric acid vapor, the size of the network will be considerably reduced.

E2. The films yielded by the treatments A1 and A4 are not hard enough to withstand the dies in the tin stamping industry. The coatings can therefore be further hardened, say, for two hours in pure air at 100 degrees centigrade.

F1. If 15 per cent. of the spirit in example A1 be replaced by Chinese wood oil, the crystalline effect will be greatly altered. It will be much duller, the striations which fill in the network being finer or broken up into dots.

G1. If the surface be locally treated with some reagent which will change the character of the varnish, such localities will exhibit different characteristics to the remainder of the surface. A solution of gum in turpentine will effect such a result.

In the accompanying drawings Figure 1 is a vertical section on the line 1—1 of Fig. 2, showing one form of apparatus for carrying the invention into effect, and Fig. 2 is a horizontal section of the treatment chamber on the line 2—2 of Fig. 1.

Fig. 3 is a central vertical section of the vaporizing device.

Fig. 4 shows the appearance of the varnish which certain conditions of treatment will produce, for instance, that described in example A1 above, and Fig. 5 shows the appearance of the varnish when the treatment is carried still further.

Fig. 6 shows how the varnished surface may be treated with gum at certain parts, as described in example G1 above, to produce different characteristics locally.

$a$ is the gas-tight chamber having an opening $a'$ at its front which is closed by a door $a^2$.

$b$ represents the pipes through which the heating medium may circulate to raise the temperature of the chamber as desired.

The floor of the chamber $a$ consists of iron gratings $c$ supported upon girders $c'$. Below the said girders $c'$ are located pipes $d$ having fine holes $d'$ in their sides through which the vapor is supplied to the interior of the chamber $a$. The pipes $d$ are connected with the vaporizer which consists of an outer casing $e$ and cap $e'$, which latter is removed when it is desired to place the charge of liquid in the basin $f$. The casing $e$ and basin $f$ are supported by the stand $g$, beneath which is located the heating apparatus $h$, which, as here shown, is in the form of a gas burner. $e^2$ is a pipe the lower end of which dips into the basin $f$ and through which a blast of air is caused to pass in any convenient manner.

Fig. 6 shows a surface on which the letter H has first been printed in gum and allowed to dry. The whole surface is then varnished and submitted to a vapor such as nitric acid or its equivalent according to the test hereinbefore described. The portion of the surface previously coated with gum is in effect coated with a varnish having more gum than the varnish which coats the surrounding surface. The result is that the vapor acts differently upon the different varnishes and causes the letter H to dry glossy, whereas it causes the remainder of the varnish to dry with a crystalline effect such as that shown.

What we claim as our invention is:—

1. A process for controlling the crystalline structure, color, and hardness of decorative surfaces coated with varnish and like fluids, which consists in exposing such coated surfaces to the action of a vapor equivalent to nitric acid vapor, substantially as set forth.

2. A process for controlling the crystalline structure, color and hardness of decorative surfaces coated with varnish and like fluids, which consists in placing the decorative surfaces in a chamber and admitting to such chamber a vapor equivalent to nitric acid vapor, substantially as set forth.

3. A process for controlling the crystalline structure, color and hardness of decorative surfaces coated with varnish and like fluids, which consists in exposing such coated surfaces to the action of a vapor which will produce some form of crystalline structure, a deeper coloration and a harder surface, than if the said varnish had been exposed at the same temperature and for the same period to the action of pure air or the unmodified atmosphere of an internally heated gas oven.

4. A process for controlling the crystalline structure, color and hardness of decorative surfaces coated with varnish and like fluids, which consists in exposing such coated surfaces to the action of a plurality of vapors one of which is the equivalent of nitric acid vapor.

5. A process for controlling the crystalline structure, color and hardness of decorative surfaces coated with varnish and like fluids, which consists in exposing such coated surfaces to the action of a plurality of vapors one of which is the equivalent of nitric acid vapor in any number of successive operations.

6. A process for controlling the crystalline structure, color and hardness of decorative surfaces coated with varnish and like fluids, which consists in exposing such coated surfaces to the action of a plurality of vapors one of which is the equivalent of nitric acid vapor and one of which is pure air.

7. A process for controlling the crystalline structure, color and hardness of decorative surfaces coated with varnish and like fluids, which consists in treating a part of said surfaces and in exposing the whole of said surfaces to the action of a vapor which is the equivalent of nitric acid vapor which will react differently upon the treated part to the manner in which it will react upon the untreated part.

8. A process for controlling the crystalline structure, color and hardness of decorative surfaces coated with varnish and like fluids, which consists in exposing such coated surfaces to the action of a plurality of vapors one of which is the equivalent of nitric acid vapor and one of which is the unmodified atmosphere of an internally heated gas oven, substantially as set forth.

9. A process for controlling the crystalline structure, color and hardness of decorative surfaces coated with varnish and like fluids, which consists in exposing such coated surfaces to the action of the equivalent of nitric acid vapor and in adjusting the composition of the varnish and like fluids to suit the action of the said vapor, substantially as set forth.

In testimony whereof we have hereunto set our hands.

GEORGE H. HADFIELD.
ALFRED E. BAWTREE.